(12) United States Patent
Williams et al.

(10) Patent No.: US 7,964,657 B2
(45) Date of Patent: Jun. 21, 2011

(54) POLYMERIC DISPERSIONS AND APPLICATIONS THEREOF

(75) Inventors: Michael S. Williams, Rome, GA (US); Michael Grigat, Rome, GA (US); Robert S. Jackson, Cartersville, GA (US)

(73) Assignee: Peach State Labs, Inc., Rome, GA (US)

( * ) Notice: Subject to any disclaimer, the term of this patent is extended or adjusted under 35 U.S.C. 154(b) by 684 days.

(21) Appl. No.: 11/728,200

(22) Filed: Mar. 23, 2007

(65) Prior Publication Data

US 2008/0234415 A1 Sep. 25, 2008

(51) Int. Cl.
| | |
|---|---|
| C08K 5/00 | (2006.01) |
| C08K 3/20 | (2006.01) |
| C08F 2/16 | (2006.01) |
| C08L 9/00 | (2006.01) |
| C08L 11/02 | (2006.01) |
| C08L 13/02 | (2006.01) |
| C08L 19/02 | (2006.01) |
| C08L 21/02 | (2006.01) |
| C08L 1/00 | (2006.01) |
| C08L 3/00 | (2006.01) |
| C08L 5/00 | (2006.01) |
| C08L 7/02 | (2006.01) |
| B01F 3/08 | (2006.01) |
| B01F 3/02 | (2006.01) |
| C09B 67/00 | (2006.01) |

(52) U.S. Cl. ............ 524/211; 524/458; 516/20; 516/31; 523/333

(58) Field of Classification Search .................. 524/211, 524/507, 458; 516/20, 31; 523/333
See application file for complete search history.

(56) References Cited

U.S. PATENT DOCUMENTS

| | | | |
|---|---|---|---|
| 3,062,765 A | 11/1962 | Sherman at al. | |
| 3,068,187 A | 12/1962 | Bolstad et al. | |
| 3,329,661 A | 7/1967 | Smith at al. | |
| 3,403,122 A | 9/1968 | Sherman et al. | |
| 3,997,507 A | 12/1976 | Kirimoto et al. | |
| 4,195,008 A | 3/1980 | Gruber et al. | |
| 4,795,793 A | 1/1989 | Amimoto et al. | |
| 5,021,527 A | 6/1991 | Ohmori et al. | |
| 5,057,577 A | 10/1991 | Matsuo et al. | |
| 5,093,398 A | 3/1992 | Rottger et al. | |
| 5,688,309 A * | 11/1997 | Shimada et al. | 106/2 |
| 5,883,175 A | 3/1999 | Kubo et al. | |
| 6,111,043 A | 8/2000 | Corpart et al. | |
| 6,126,849 A | 10/2000 | Yamana et al. | |
| 6,130,298 A | 10/2000 | Yamana et al. | |
| 6,133,365 A | 10/2000 | Verge et al. | |
| 6,177,531 B1 | 1/2001 | Shimada et al. | |
| 6,207,777 B1 * | 3/2001 | Shimada et al. | 526/245 |
| 6,376,592 B1 | 4/2002 | Shimada et al. | |
| 6,395,821 B1 | 5/2002 | Shimada et al. | |
| 6,472,019 B1 | 10/2002 | Yamaguchi et al. | |
| 6,518,380 B2 | 2/2003 | Juhue et al. | |
| 6,590,035 B2 | 7/2003 | Shimada et al. | |
| 6,610,775 B1 | 8/2003 | Oharu et al. | |
| 6,624,268 B1 | 9/2003 | Maekawa et al. | |
| 6,646,043 B2 | 11/2003 | Funaki et al. | |
| 6,653,376 B2 | 11/2003 | Sugimoto et al. | |
| 6,716,944 B2 | 4/2004 | Maekawa et al. | |
| 6,720,371 B2 | 4/2004 | Furuta et al. | |
| 6,740,357 B2 | 5/2004 | Yamaguchi et al. | |
| 6,774,176 B1 | 8/2004 | Nzudie et al. | |
| 6,860,926 B2 | 3/2005 | Ishikawa et al. | |
| 6,894,106 B2 | 5/2005 | Aga et al. | |
| 6,933,338 B2 | 8/2005 | Sugimoto et al. | |
| 6,939,580 B2 | 9/2005 | Enomoto et al. | |
| 7,147,669 B2 | 12/2006 | Yamaguchi et al. | |
| 2001/0051686 A1 | 12/2001 | Tabacchi et al. | |
| 2006/0111490 A1 * | 5/2006 | Fonolla Moreno | 524/211 |

FOREIGN PATENT DOCUMENTS

| | | |
|---|---|---|
| DE | 4302552 | 8/1994 |
| DE | 10209818 | 9/2003 |
| EP | 0919576 | 6/1999 |
| GB | 1001612 | 8/1965 |
| GB | 1209109 | 10/1970 |
| JP | 59150175 A * | 8/1984 |
| JP | S59-150175 | 8/1984 |
| JP | 5-17538 | 1/1993 |
| JP | 6-49319 | 2/1994 |
| JP | 11-255995 | 9/1999 |
| JP | 2006028381 | 2/2006 |
| WO | WO-2008118796 | 10/2008 |

OTHER PUBLICATIONS

PCT/US2008/057880 International Search Report and Written Opinion dated Nov. 7, 2008.

* cited by examiner

*Primary Examiner* — Mark Eashoo
*Assistant Examiner* — Angela C Scott
(74) *Attorney, Agent, or Firm* — Kilpatrick, Townsend & Stockton LLP

(57) ABSTRACT

The present invention provides methods of conducting emulsion polymerizations and dispersion resulting therefrom. The present invention additionally provides substrates coated or treated with polymeric dispersions.

52 Claims, No Drawings

POLYMERIC DISPERSIONS AND APPLICATIONS THEREOF

FIELD OF THE INVENTION

The present invention relates to emulsion polymerizations and polymeric dispersions resulting therefrom.

BACKGROUND OF THE INVENTION

Emulsion polymerization is an advantageous process involving radical chain polymerization of monomers in the form of colloidal dispersions. Emulsion polymerization bears some resemblance to suspension polymerization. Any similarities, however, are superficial as emulsion polymerization generally demonstrates significantly different reaction mechanisms and properties. Emulsion polymerization, for example, differs from suspension polymerization in the type and smaller size of the particles in which polymerization occurs, in the kind of initiator employed, and in the dependence of polymer molecular weight on reaction parameters. Emulsion polymerization additionally offers the unique advantage of being operable to simultaneously attain high molecular weights and high reaction rates.

Emulsion polymerization is used to manufacture several commercially important polymers. Fluorinated polymers and copolymers are examples of commercially important polymeric materials produced by emulsion polymerizations. Fluorinated polymers are used in various applications including the treatment of materials such as textiles, leather, carpet, and paper to impart hydrophobic and oleophobic properties to such materials. The polymerization of fluorinated monomers according to traditional emulsion polymerization techniques presents several challenges. One of the most difficult challenges is addressing the solubility variances between the hydrophobic fluorinated monomers and the aqueous dispersing medium. In order to increase the solubility of fluorinated monomers in the aqueous dispersing medium, water-soluble organic cosolvents are often added to the dispersing medium.

The addition of organic cosolvents to the dispersing medium, while enhancing solubilization and polymerization of hydrophobic species, presents several drawbacks. Many of the organic cosolvents used in emulsion polymerization processes, for example, are accompanied by governmental regulations due to various environmental considerations, which can increase costs to ensure compliance with the regulations. Moreover, organic cosolvents can negatively impact various properties of polymeric dispersions. Organic cosolvents, for example, can negatively impact the desired repellant and protective properties of the polymeric dispersion, especially when the polymeric dispersion is applied to a substrate such as a fabric. Additionally, organic cosolvents can negatively impact wash fastness and other fastness of dispersed dyed textile substrates that have been treated with polymeric dispersions comprising organic cosolvents.

Organic cosolvents can be distilled out of polymeric dispersions. The distillation process, nevertheless, increases production time and the energy required to produce the polymeric dispersions. Distillation procedures can additionally destabilize the polymeric dispersion. Furthermore, many organic cosolvents suitable for use in emulsion polymerization systems are costly adding even more expense to the production process.

SUMMARY

In view of the foregoing problems with organic cosolvents, it would be desirable to provide polymeric dispersions resulting from emulsion polymerizations having reduced or no organic cosolvent content. It would additionally be desirable to provide methods of conducting emulsion polymerizations wherein little or no organic cosolvent is used.

The present invention provides polymeric dispersions comprising reduced or substantially no organic cosolvent content as well as methods for conducting emulsion polymerizations with reduced or substantially no organic cosolvent. The present invention additionally provides substrates coated or treated with polymeric dispersions comprising reduced or substantially no organic cosolvent content. Substrates coated or treated with polymeric dispersions of the present invention, in some embodiments, demonstrate advantageous properties such as improved repellencies and increased resistance to flammability.

In one embodiment, the present invention provides a dispersion comprising at least one emulsifier, a monomeric component, and a continuous phase comprising an aqueous solution of a compound of Formula (I)

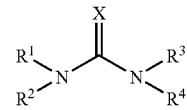

wherein X is O or S and, wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, —C(O)OR$^5$, and —C(O)R$^5$, wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from $R^5$, wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

In some embodiments, at least one emulsifier comprises a surfactant. Surfactants suitable for use in dispersions, according to embodiments of the present invention, comprise anionic surfactants, cationic surfactants, nonionic surfactants, amphoteric surfactants, or combinations thereof.

A monomeric component, according embodiments of the present invention, comprises a plurality of monomers having at least one polymerizable functionality. In some embodiments, a polymerizable functionality comprises a point of unsaturation, such as a carbon double bond or carbon triple bond. In other embodiments, a polymerizable functionality comprises an amine functionality, an isocyanate functionality, or a carboxylic acid functionality. In a further embodiment, a polymerizable functionality comprises an alcohol or hydroxyl functionality.

Monomers, in some embodiments, comprise vinylic monomers, allylic monomers, or combinations thereof. In some embodiments, monomers comprise hydrophobic monomers, such as perfluorinated monomers, hydrophilic monomers, or combinations thereof. Monomers, according to embodiments of the present invention, are selected according to the desired polymer to be produced.

A dispersion, in some embodiments, further comprises an organic cosolvent. In some embodiments, an organic cosolvent is water-soluble. Organic cosolvents, in some embodiments, comprise acetone, methyl ethyl ketone, ethyl acetate, propylene glycol, dipropylene glycol monomethyl ether, dipropylene glycol, tripropylene glycol, hexylene glycol, ethanol, or mixtures thereof. In other embodiments, a dispersion comprising at least one emulsifier, a monomeric component, and a continuous phase comprising an aqueous solution of a compound of Formula (I) does not comprise an organic cosolvent.

In some embodiments, a dispersion comprising at least one emulsifier, a monomeric component, and a continuous phase comprising an aqueous solution of a compound of Formula (I) is a colloidal dispersion.

In another aspect, the present invention provides polymeric dispersions. In one embodiment, a polymeric dispersion comprises at least one emulsifier, a dispersed phase comprising a polymeric component, and a continuous phase comprising an aqueous solution of a compound of Formula (I)

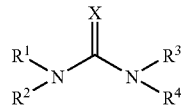

wherein X is O or S and,
wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, —C(O)OR$^5$, and —C(O)R$^5$,
wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

In some embodiments of a polymeric dispersion, at least one emulsifier comprises a surfactant. Surfactants suitable for use in polymeric dispersions, according to embodiments of the present invention, comprise anionic surfactants, cationic surfactants, nonionic surfactants, amphoteric surfactants, or combinations thereof.

A polymeric component, in some embodiments, comprises a plurality of polymeric particles. Polymeric particles, in some embodiments, have an average size ranging from about 0.5 nm to about 3 μm. In other embodiments, polymeric particles have an average size ranging from about 1 nm to about 1 μm. In another embodiment, polymeric particles have an average size ranging from about 10 nm to about 800 nm, from about 50 nm to about 500 nm, or from about 75 nm to about 300 nm. In a further embodiment, polymeric particles have an average size ranging from about 100 nm to about 200 nm. In some embodiments, polymeric particles have an average size greater than about 1 μm. In one embodiment, polymeric particles have an average size ranging from about 20 nm to about 100 nm or from about 40 nm to about 130 nm.

Polymeric particles, in some embodiments, comprise hydrophobic polymers, oleophobic polymers, or combinations thereof. In some embodiments, polymeric particles comprise fluoropolymers including, but not limited to, fluoroalkyl methacrylates, fluoroalkyl acrylates, fluoroalkyl aryl urethanes, aliphatic fluoroalkyl urethanes, fluoroalkyl allyl urethanes, fluoroalkyl urethane acrylates, fluoroalkyl acrylamides, or fluoroalkyl sulfonamide acrylates or mixtures thereof. In other embodiments, polymeric particles comprise polytetrafluoroethylene (PTFE), fluorinated ethylene-propylene (FEP), perfluoroalkoxy resin (PFA), polychlorotrifluoroethylene (PCTFE), ethylene-tetrafluoroethylene (EPTFE), polyvinylidene fluoride (PVDF), or polyvinyl fluoride (PVF) or mixtures thereof.

In some embodiments, polymeric particles comprise olefinic polymers including, but not limited to, polyethylene, polypropylene, polybutene, or mixtures thereof. In a further embodiment, polymeric particles comprise elastomers including, but not limited to, 1,3-dienes and derivatives thereof. 1,3-dienes comprise styrene-1,3-butadiene (SBR), styrene-1,3-butadiene terpolymer with an unsaturated carboxylic acid (carboxylated SBR), acrylonitrile-1,3-butadiene (NBR or nitrile rubber), isobutylene-isoprene, cis-1,4-polyisoprene, 1,4-poly(1,3-butadiene), polychloroprene, and block copolymers of isoprene or 1,3-butadiene with styrene such as styrene-ethylene-butadiene-styrene (SEBS). In another embodiment, elastomers comprise polyalkene oxide polymers, acrylics, or polysiloxanes (silicones), fluoroelastomers, or combinations thereof.

In one embodiment, polymeric particles comprise polyvinyl chloride or acrylics such as polyacrylic acid, polymethacrylate, polymethylmethacrylate, or mixtures thereof. In some embodiments, polymeric particles comprise polyamides, polyesters, polyurethanes, or combinations thereof. In other embodiments, polymeric particles comprise polystyrenes, polyvinyl acetates, vinylacetate-ethylene copolymers, or mixtures thereof.

A polymeric dispersion, in some embodiments, further comprises an organic cosolvent. In some embodiments, an organic cosolvent is water-soluble. Organic cosolvents, in some embodiments, comprise acetone, methyl ethyl ketone, ethyl acetate, propylene glycol, dipropylene glycol monomethyl ether, dipropylene glycol, tripropylene glycol, hexylene glycol, ethanol, or mixtures thereof. In other embodiments, a polymeric dispersion does not comprise an organic cosolvent.

In some embodiments, a polymeric dispersion comprising at least one emulsifier, a dispersed phase comprising a polymeric component, and a continuous phase comprising an aqueous solution of a compound of Formula (I) is a colloidal dispersion.

In another aspect, the present invention provides substrates coated or treated with a polymeric dispersion of the present invention. In one embodiment, a substrate comprises at least one surface at least partially coated with a polymeric dispersion comprising a dispersed phase comprising a polymeric component and a continuous phase comprising an aqueous solution of a compound of Formula (I)

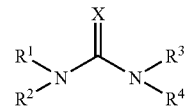

wherein X is O or S, and
wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, —C(O)OR$^5$, and —C(O)R$^5$,
wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

In some embodiments, a substrate comprises a plurality of surfaces wherein each of the plurality of surfaces is at least partially coated with a polymeric dispersion of the present invention. Substrates, in some embodiments, comprise cellulosic materials, including paper, wood, cellulose acetate fibers, and cotton materials, including, but not limited to, cotton fibers, woven cotton articles, and non-woven cotton articles. In other embodiments, a substrate comprises natural fibers in addition to cellulose fibers including, but not limited to, wool and silk fibers. In another embodiment, a substrate comprises synthetic fibers. Synthetic fibers, in some embodiments, comprise nylon (polyamide) fibers, polyester fibers, polyolefin fibers, polyurethane fibers, polyacrylonitrile fibers, or combinations thereof. In a further embodiment, a substrate comprises leather, thermoplastics, thermosets, metals, porcelain, carpet, masonry, stones, brick, wood, plastics, painted surfaces, and dyed surfaces.

In some embodiments, a substrate comprising at least one surface at least partially coated with a polymeric dispersion of the present invention comprising a dispersed phase comprising a polymeric component and a continuous phase comprising an aqueous solution of a compound of Formula (I) has an oil repellency of at least 5 according to AATCC 118. In other embodiments, the treated substrate has an oil repellency of at least 6 according to AATCC 118. In a further embodiment, the treated substrate has an oil repellency of at least 7 according to AATCC 118. In some embodiments, polymeric dispersions of the present invention at least partially coating surfaces of substrates having the foregoing oil repellencies do not comprise an organic cosolvent. In other embodiments, the polymeric dispersion comprises an organic cosolvent.

In some embodiments, a substrate comprising at least one surface at least partially coated with a polymeric dispersion of the present invention comprising a dispersed phase comprising a polymeric component and a continuous phase comprising an aqueous solution of a compound of Formula (I) has a water/alcohol repellency of at least 6 according to AATCC 193. In other embodiments, the treated substrate has a water/alcohol repellency of at least 8 according to AATCC 193. In some embodiments, polymeric dispersions of the present invention at least partially coating surfaces of substrates having the foregoing water/alcohol repellencies do not comprise an organic cosolvent. In other embodiments, the polymeric dispersions comprise an organic cosolvent.

In some embodiments, a substrate comprising at least one surface at least partially coated with a polymeric dispersion of the present invention comprising a dispersed phase comprising a polymeric component and a continuous phase comprising an aqueous solution of a compound of Formula (I) has a spray rating of at least 70 according to AATCC 22. In other embodiments, the treated substrate has a spray rating of at least 80 according to AATCC 22. In another embodiment, the treated substrate has a spray rating of at least 90 according to AATCC 22. In a further embodiment, the treated substrate has a spray rating of 100 according to AATCC 22. In some embodiments, polymeric dispersions of the present invention at least partially coating surfaces of substrates having the foregoing spray ratings do not comprise an organic cosolvent. In other embodiments, the polymeric dispersions comprise an organic cosolvent.

In some embodiments, a substrate comprising at least one surface at least partially coated with a polymeric dispersion comprising a dispersed phase comprising a polymeric component and a continuous phase comprising an aqueous solution of a compound of Formula (I) has a dry crocking fastness of at least 3.5 according to AATCC 8. In other embodiments, the treated substrate has a dry crocking fastness of at least 4.5 according to AATCC 8.

Moreover, in some embodiments, a substrate comprising at least one surface at least partially coated with a polymeric dispersion comprising a dispersed phase comprising a polymeric component and a continuous phase comprising an aqueous solution of a compound of Formula (I) has a wet crocking fastness of at least 3.5 according to AATCC 8. In other embodiments, the treated substrate has a wet crocking fastness of at least 4.5 according to AATCC 8.

In some embodiments, polymeric dispersions of the present invention at least partially coating surfaces of substrates having the foregoing dry and/or wet crocking fastness do not comprise an organic cosolvent. In other embodiments, the polymeric dispersions comprise an organic cosolvent.

In some embodiments, substrates having at least one surface at least partially coated with a polymeric dispersion of the present invention displaying one or more of the AATCC properties provided herein comprise synthetic fibers. In other embodiments, the substrates comprise natural fibers, such as cellulosic fibers.

In another aspect, the present invention provides methods of conducting emulsion polymerizations. In one embodiment, a method of conducting an emulsion polymerization comprises providing a dispersion comprising at least one emulsifier, at least one initiator, a monomeric component, and a continuous phase comprising an aqueous solution of a compound of Formula (I)

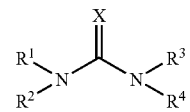

wherein X is O or S and,
wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, —C(O)OR$^5$, and —C(O)R$^5$,
wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

In some embodiments, a method of conducting an emulsion polymerization further comprises forming a polymeric material. Forming a polymeric material, in some embodiments, comprises initiating polymerization of the monomeric component with the at least one initiator, propagating polymerization of the monomeric component, and terminating polymerization of the monomeric component.

In another embodiment, a method of conducting an emulsion polymerization comprises providing a dispersion comprising at least one emulsifier, at least one initiator, a monomeric component, and an aqueous continuous phase; initiating polymerization of the monomeric component with the at least one initiator; and adding to the continuous phase during polymerization of the monomeric component a compound of Formula (I). In some embodiments, a compound of Formula (I) is added directly to the continuous phase. In other embodiments, a compound of Formula (I) is solubilized in water, and the resulting aqueous solution is added to the continuous phase.

In a further embodiment, a method of conducting an emulsion polymerization comprises providing a dispersion comprising at least one emulsifier, at least one initiator, a monomeric component, and an aqueous continuous phase; forming a polymeric material; and adding to the continuous phase, after forming the polymeric material, a compound of Formula (I). In some embodiments, forming a polymeric material comprises initiating polymerization of the monomeric component with the initiator, propagating polymerization of the monomeric component, and terminating polymerization of the monomeric component.

In some embodiments of the present invention, methods of conducting emulsion polymerizations further comprise adding an organic cosolvent to the dispersion. In some embodiments, the organic cosolvent is added to the dispersion prior to initiation of polymerization of the monomeric component. In other embodiments, the organic cosolvent is added to the dispersion after initiation of polymerization of the monomeric component. In a further embodiment, substantially no organic cosolvent is added to dispersion during any stage of the emulsion polymerization.

In another aspect, the present invention provides methods of increasing the resistance to flammability of dispersions, including polymeric dispersions. In some embodiments, a method of increasing the resistance to flammability of a dispersion comprises adding a compound of Formula (I) to the dispersion. In some embodiments, a dispersion comprises a polymeric dispersion. In other embodiments, a dispersion comprises a monomeric component.

In another embodiment, a method of increasing the resistance to flammability of a dispersion comprising an organic solvent comprises substituting at least a portion of the organic solvent with a compound of Formula (I). In some embodiments, substantially all of the organic solvent is substituted by a compound of Formula (I) or solution thereof.

In an additional aspect, the present invention provides methods of producing a coated substrate. In one embodiment, a method of producing a coated substrate comprises providing a substrate having at least one surface, providing a polymeric dispersion comprising a dispersed phase comprising a polymeric component and a continuous phase comprising an aqueous solution of a compound of Formula (I), and applying the polymeric dispersion to at least a portion of the at least one surface. In some embodiments, the polymeric dispersion is applied to the entire surface.

In some embodiments, applying the polymeric dispersion comprises spray coating, dip coating, passing the substrate through kiss rollers, or spreading onto or coating the at least one surface through a head box, optionally with the aid of a doctor blade.

These and other embodiments of the present invention are described in greater detail in the detailed description which follows. These and other features and advantages of the present invention will become apparent after review of the following detailed description of the disclosed embodiments.

DETAILED DESCRIPTION

Definitions

In the structural formulas provided herein and throughout the present specification, the following terms have the indicated meaning:

The term "optionally substituted" as used herein means that the group in question is either unsubstituted or substituted with one or more of the substitutents specified. When the groups in question are substituted with more than one substitutent, the substitutent may be the same or different.

The use of prefixes of the structure $C_{x-y}$alkyl, $C_{x-y}$alkenyl, $C_{x-y}$alkynyl, $C_{x-y}$cylcoalkyl, designate a radical having from x to y carbon atoms.

The term "alkyl" as used herein, alone or in combination, refers to a straight or branched chain saturated monovalent hydrocarbon radical having from one to ten carbon atoms, for example $C_{1-8}$-alkyl or $C_{1-6}$-alkyl. Typical $C_{1-8}$-alkyl groups and $C_{1-6}$-alkyl groups include, but are not limited to e.g. methyl, ethyl, n-propyl, isopropyl, n-butyl, sec-butyl, isobutyl, tert-butyl, n-pentyl, 2-methylbutyl, 3-methylbutyl, 4-methylpentyl, neopentyl, n-pentyl, n-hexyl, 1,2-dimethylpropyl, 2,2-dimethylpropyl, 1,2,2-trimethylpropyl and the like. The term "$C_{1-8}$-alkyl" as used herein also includes secondary $C_{3-8}$-alkyl and tertiary $C_{4-8}$-alkyl. The term "$C_{1-6}$-alkyl" as used herein also includes secondary $C_{3-6}$-alkyl and tertiary $C_{4-6}$-alkyl.

The term "alkenyl" as used herein, alone or in combination, refers to a straight or branched chain monovalent hydrocarbon radical containing from two to ten carbon atoms and at least one carbon-carbon double bond, for example $C_{2-8}$-alkenyl or $C_{2-6}$-alkenyl. Typical $C_{2-8}$-alkenyl groups and $C_{2-6}$-alkenyl groups include, but are not limited to, vinyl, 1-propenyl, 2-propenyl, iso-propenyl, 1,3-butadienyl, 1-butenyl, 2-butenyl, 3-butenyl, 2-methyl-1-propenyl, 1-pentenyl, 2-pentenyl, 3-pentenyl, 4-pentenyl, 3-methyl-2-butenyl, 1-hexenyl, 2-hexenyl, 3-hexenyl, 2,4-hexadienyl, 5-hexenyl and the like.

The term "alkynyl" as used herein alone or in combination, refers to a straight or branched monovalent hydrocarbon radical containing from two to ten carbon atoms and at least one triple carbon-carbon bond, for example $C_{2-8}$-alkynyl or $C_{2-6}$-alkynyl. Typical $C_{2-8}$-alkynyl groups and $C_{2-6}$-alkynyl groups include, but are not limited to, ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 5-hexynyl, 2,4-hexadiynyl and the like.

The term "cycloalkyl" as used herein, alone or in combination, refers to a non-aromatic monovalent hydrocarbon radical having from three to twelve carbon atoms, and optionally with one or more degrees of unsaturation, for example $C_{3-8}$-cycloalkyl. Such a ring may be optionally fused to one or more benzene rings or to one or more of other cycloalkyl ring(s). Typical $C_{3-8}$-cycloalkyl groups include, but are not limited to, cyclopropyl, cyclobutyl, cyclopentyl, cyclohexyl, cyclohexenyl, cycloheptyl, cycloheptenyl, cyclooctyl and the like.

The term "heterocyclic" or the term "heterocyclyl" as used herein, alone or in combination, refers to a three to twelve membered heterocyclic ring having one or more degrees of unsaturation containing one or more heteroatomic substitutions selected from S, SO, $SO_2$, O, or N, for example $C_{3-8}$-heterocyclyl. Such a ring may be optionally fused to one or more of another "heterocyclic" ring(s) or cycloalkyl ring(s). Typical $C_{3-8}$-heterocyclyl groups include, but are not limited to, tetrahydrofuran, 1,4-dioxane, 1,3-dioxane, piperidine, pyrrolidine, morpholine, piperazine, and the like.

The term "alkoxy" as used herein, alone or in combination, refers to the monovalent radical RO—, where R is alkyl as defined above, for example $C_{1-8}$-alkyl giving $C_{1-8}$-alkoxy. Typical $C_{1-8}$-alkoxy groups include, but are not limited to, methoxy, ethoxy, n-propoxy, isopropoxy, butoxy, sec-butoxy, tert-butoxy, pentoxy, isopentoxy, hexoxy, isohexoxy and the like.

The term "carbamoyl" as used herein refers to $NH_2C(O)—$.

The term "aryl" as used herein refers to a carbocyclic aromatic ring radical or to a aromatic ring system radical. Aryl is also intended to include the partially hydrogenated derivatives of the carbocyclic systems.

The term "heteroaryl" as used herein, alone or in combination, refers to an aromatic ring radical with for instance 5 to 7 member atoms, or to a aromatic ring system radical with for instance from 7 to 18 member atoms, containing one or more heteroatoms selected from nitrogen, oxygen, or sulfur heteroatoms, wherein N-oxides and sulfur monoxides and sulfur dioxides are permissible heteroaromatic substitutions; such as e.g. furanyl, thienyl, thiophenyl, pyrrolyl, imidazolyl, pyrazolyl, triazolyl, tetrazolyl, thiazolyl, oxazolyl, isoxazolyl, oxadiazolyl, thiadiazolyl, isothiazolyl, pyridinyl, pyridazinyl, pyrazinyl, pyrimidinyl, quinolinyl, isoquinolinyl, benzofuranyl, benzothiophenyl, indolyl, and indazolyl, and the like. Heteroaryl is also intended to include the partially hydrogenated derivatives of the heterocyclic systems enumerated below.

The terms "fluoroalkyl," "fluoroalkenyl," and "fluoroalkynyl" as used herein have the same respective meanings as alkyl, alkenyl, and alkynyl above provided that at least one carbon atom of the groups is substituted with at least one fluorine atom. In some embodiments, more than one carbon atom of the alkyl, alkenyl, or alkynyl group is substituted with one or more fluorine atoms.

The present invention provides dispersions comprising reduced or substantially no organic cosolvent content as well as methods of conducting emulsion polymerizations with reduced or substantially no organic cosolvent. The present invention additionally provides substrates coated or treated with polymeric dispersions comprising reduced or substantially no organic cosolvent content.

In one embodiment, the present invention provides a dispersion comprising at least one emulsifier, a monomeric component, and a continuous phase comprising an aqueous solution of a compound of Formula (I)

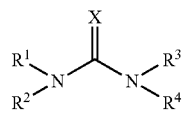

wherein X is O or S and,
wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, —C(O)OR$^5$, and —C(O)R$^5$,
wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from R$^5$,
wherein R$^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

Turning now to components that can be included in dispersions of the present invention, dispersions of the present invention comprise at least one emulsifier. In some embodiments, at least one emulsifier comprises a surfactant. Surfactants suitable for use in dispersions of the present invention, according to some embodiments, comprise anionic surfactants, cationic surfactants, nonionic surfactants, amphoteric surfactants, or combinations thereof.

In some embodiments, anionic surfactants comprise alkyl sulfates, alkylbenzenesulfonates, ether sulfates, α-olefin sulfonates, ester sulfonates, dialkylsulfosuccinates, phosphate esters, acyl taurates, soaps, ether carboxylates, or mixtures thereof. Cationic surfactants, in some embodiments, comprise alkyl quaternary ammonium salts, benzylalkyldimethylammonium salts, amidoamine quaternaries, alkylamine salts, quaternary imidazolium compounds, ester quaternary compounds, or mixtures thereof. In some embodiments, nonionic surfactants comprise ethoxylated alcohols, ethoxylated alkylphenols, polyethylene glycol esters, fatty acid alkanolamides, ethoxylated alkanolamides, ethoxylated amines, esters of polyhydroxy compounds, ethoxylated esters, ethylene oxide/propylene oxide copolymers, perfluorinated ethoxylates, copolymers of perfluorinated acrylates or methacrylates with ethoxylated acrylates or methacrylates, amine oxides, or mixtures thereof. Amphoteric surfactants, in some embodiments, comprise alkylamino acids, alkylbetaines, alkylsulfobetaines, alkylaminobetaines, imidazoline-derived surfactants, sulfur containing amphoterics, lecithin, or mixtures thereof. In some embodiments, surfactants suitable for use in embodiments of the present invention comprise Geropon®, Rhodacal®, and Rhodafac® commercially available from Rhodia of Paris France, Pluronic® commercially available from BASF of Florham Park, N.J., Fluowet®, Genapol®, Hostapur®, and Hostapal®, commercially available from Clariant of Mettenz, Switzerland, Neodol® commercially available from Shell Chemicals, and Zonyl® commercially available from DuPont of Wilmington, Del.

In some embodiments, a dispersion comprises one or a plurality of emulsifiers in an amount ranging from about 0.1 weight percent to about 20 weight percent of the dispersion. In other embodiments, a dispersion comprises at least one emulsifier in an amount ranging from about 0.5 weight percent to about 15 weight percent of the dispersion. In another embodiment, a dispersion comprises at least one emulsifier in an amount ranging from about 1 weight percent to about 10 weight percent of the dispersion. In a further embodiment, a dispersion comprises at least one emulsifier in an amount ranging from about 2 weight percent to about 5 weight percent of the dispersion. In some embodiments, a dispersion comprises at least one emulsifier in an amount less than about 0.1 weight percent or greater than 20 weight percent of the dispersion.

In addition to at least one emulsifier, dispersions, in some embodiments, comprise a monomeric component. A monomeric component, according to embodiments of the present invention, comprises a plurality of monomers having at least one polymerizable functionality. In some embodiments, a polymerizable functionality comprises a point of unsaturation, such as a carbon double bond or a carbon triple bond. In other embodiments, a polymerizable functionality comprises an amine functionality, isocyanate functionality, or a carboxylic acid functionality. In a further embodiment, a polymerizable functionality comprises an alcohol or hydroxyl functionality.

Monomers, in some embodiments, comprise vinylic monomers, allylic monomers, or combinations thereof. In some embodiments, monomers comprise hydrophobic monomers, such as long chain hydrocarbon monomers, hydrophilic monomers, oleophobic monomers, such as perfluorinated monomers, or combinations thereof. In some embodiments, the plurality of monomers are the same. In other embodiments, the plurality of monomers are different. Monomers, according to embodiments of the present invention, are selected according to the desired polymer to be produced.

In some embodiments, monomers comprise vinylic monomers. Vinylic monomers, in some embodiments, comprise stearyl methacrylate, stearyl acrylate, biphenyl methacrylate, biphenyl acrylate, oleyl methacrylate, oleyl acrylate, lauryl methacrylate, lauryl acrylate, isodecyl methacrylate, isodecyl acrylate, isooctyl methacrylate, isooctyl acrylate, 2-ethylhexyl methacrylate, 2-ethyl-hexyl acrylate, n-hexyl methacrylate, n-butyl methacrylate, n-butyl acrylate, i-butyl methacrylate, i-butyl acrylate, ethyl methacrylate, methyl methacrylate, cyclohexyl methacrylate, cyclohexyl acrylate, isobornyl methacrylate, isobornyl acrylate, benzyl methacrylate, benzyl acrylate, trimethylcyclohexyl methacrylate, 2-hydroxyethyl methacrylate, 2-hydroxyethyl acrylate, hydroxypropyl methacrylate, hydroxypropyl acrylate, 4-hydroxybutyl methacrylate, 4-hydroxybutyl acrylate, 2-dimethylaminoethyl methacrylate, 3-dimethylaminopropyl methacrylate, 3-trimethylammonioethyl methacrylate chloride, 3-trimethylammoniopropyl methacrylamide chloride, 2-tert-butylaminoethyl methacrylate, diethylaminoethyl methacrylate, methacrylamide, N-methylol methacrylamide, N-methylol acrylamide, N-(n-butoxymethyl)methacrylamide, N-(n-butoxymethyl)acrylamide, ethyltriglycol methacrylate, ethyltriglycol acrylate, tetrahydrofurfuryl methacrylate, tetrahydrofurfuryl acrylate, 2-methoxyethyl methacrylate, 2-methoxyethyl acrylate, 2-ethoxyethyl methacrylate, 2-ethoxyethyl acrylate, methoxy polyethyleneglycol methacrylates, methoxy polyethyleneglycol acrylates, polyethyleneglycol methacrylates, polyethyleneglycol acrylates, methacrylic esters of ethoxylated fatty alcohols, acrylic esters of ethoxylated fatty alcohols, allyl methacrylate, allyl acrylate, ethyleneglycol dimethacrylate, other alkanediol dimethacrylates, other alkanediol acrylates, methacrylic acid, acrylic acid, methacrylic anhydride, glycidyl methacrylate, maleic acid, maleic anhydride, n-vinylformamide, vinyl acetate, vinyl chloride, vinylidene chloride, vinyl fluoride, vinylidene fluoride, vinyl benzylchloride, styrene, allyl heptanoate, allyl caprylate, allyl caproate, vinyl methyl ketone, vinyl ethyl ketone, isoprene, trifluoromethyl acrylate, perfluoroalkyl acrylates, or perfluoroalkyl methacrylates, or mixtures thereof. In other embodiments, vinylic monomers comprise methylol methacrylates, hydroxyl functional methacrylates, epoxy functional methacrylates, isocyanato functional methacrylates, or mixtures thereof.

In some embodiments, vinylic monomers comprise vinylic isocyanates that are blocked with typical blocking agents, acrylic or methacrylic isocyanates that are blocked with typical blocking agents, vinylic isocyanates that are reacted with perfluoroalkyl alcohols, acrylic or methacrylic isocyanates that are reacted with perfluoroalcohols, or mixtures thereof. Vinylic isocyanates, in some embodiments, comprise dimethyl-m-isopropenylbenzylisocyanate. In some embodiments, acrylic or methacrylic isocyanates comprise 2-methacryloyloxyethylisocyanate. Typical isocyanate blocking agents, in some embodiments, comprise butanone oxim, dimethylpyrazol, or combinations thereof.

In some embodiments, monomer comprise hydrocarbon monomers of differing chain lengths, aromatic monomers such as styrene, or mixtures thereof. In other embodiments, monomers comprise ionic monomers, such as monomers with anionic functionalities, cationic functionalities, or mixtures thereof. In a further embodiment, monomers comprise chlorinated monomers including, but not limited to, vinyl chloride, vinylidene chloride, or mixtures thereof.

A dispersion, in some embodiments, comprises a monomeric component in an amount ranging from about 0.1 weight percent to about 70 weight percent of the dispersion. In other embodiments, a dispersion comprises a monomeric component in an amount ranging from about 0.5 weight percent to about 60 weight percent of the dispersion. In another embodiment, a dispersion comprises a monomeric component in an amount ranging from about 1 weight percent to about 50 weight percent or from about 5 weight percent to about 30 weight percent of the dispersion. In a further embodiment, a dispersion comprises a monomeric component in an amount ranging from about 10 weight percent to about 20 weight percent of the dispersion. In some embodiments, a dispersion comprises a monomeric component in an amount less than about 0.1 weight percent or greater than about 70 weight percent of the dispersion.

Dispersions, according to some embodiments of the present invention, also comprise a continuous phase comprising an aqueous solution of a compound of Formula (I), as set forth herein. In some embodiments, a compound of Formula (I) is urea. In other embodiments, a compound of Formula (I) is dimethyl urea or diethyl urea. In a further embodiment, a compound of Formula (I) is a thiourea. In some embodiments, a compound of Formula (I) is added directly to the aqueous continuous phase. In other embodiments, a compound of Formula (I) is solubilized in water, such as demineralized water, and the resulting solution is added to the aqueous continuous phase.

A dispersion, according to some embodiments, comprises a compound of Formula (I) in an amount ranging from about 0.1 weight percent to about 50 weight percent of the dispersion. In other embodiments, a dispersion comprises a compound of Formula (I) in an amount ranging from about 0.5 weight percent to about 40 weight percent of the dispersion. In another embodiment, a dispersion comprises a compound of Formula (I) in an amount ranging from about 1 weight percent to about 30 weight percent or from about 5 weight percent to about 25 weight percent of the dispersion. In a further embodiment, a dispersion comprises a compound of Formula (I) in an amount ranging from about 10 weight percent to about 20 weight percent of the dispersion.

In some embodiments, a dispersion further comprises an initiator. Initiators, according to embodiments of the present invention, are operable to initiate polymerization of the monomeric component of the dispersion. An initiator, in some embodiments, comprises redox systems comprising a mixture of one or more persulfates with a reducing agent as well as radical creating systems such as persulfates and peroxides including, but not limited to, benzoyl peroxide, di-tert-butyl peroxide, lauryl peroxide, cumene peroxide, t-butyl peroxypivalate, diisopropyl peroxydicarbonate. In other embodiments, an initiator comprises azo derivatives including, but not limited to, azobisisobutyronitrile, 2,2'-Azobis[2-(5-methyl-2-imidazolin-2-yl)propane]dihydrochloride, 2,2'-Azobis[2-(2-imidazolin-2-yl)propane disulfate dehydrate, 2,2'-Azobis[2-(2-imidazolin-2-yl)propane]dihydrochloride, 2,2'-Azobis(2-methylpropionamide)dihydrochloride, 2,2'-Azobis[N-(2-carboxyethyl)-2-methylpropionamidine]tetrahydrate, 2,2'-Azobis[2-(3,4,5,6-tetrahydropyrimidin-2-yl)propane]dihydrochloride, 2,2'-Azobis {2-[1'-(2-hydroxyethyl)-2-imidazolin-2-yl]propane}dihydrochloride, 2,2'-Azobis[2-(2-imidazolin-2-yl)propane], 2,2'-Azobis {2-methyl-N-[1,1-bis(hydroxymethyl)-2-hydroxyethyl]propionamide, 2,2'-Azobis {2-methyl-N-[2-(1'-hydroxybutyl)]propionamide}, 2,2'-Azobis[2-methyl-N-(2-hydroxyethyl)propionamide], 2,2'-Azobis(4-methoxy-2,4-dimethyl valeronitrile), 2,2'-Azobis(2,4-dimethyl valeronitrile), Dimethyl 2,2'-azobis(2-methylpropionate), 2,2'-Azobis(2-methylbutyronitrile), 1,1'-Azobis(cyclohexane-1'-carbonitrile), 2,2'-Azobis[N-(2-propenyl)-2-methylpropionamide], 1-[(cyano-1'-methylethyl)azo]formamide, 2,2'-Azobis(N-butyl-2-methylpropionamide), and 2,2'-Azobis(N-cyclohexyl-2-methylpropionamide.

A dispersion, in some embodiments, further comprises at least one chain transfer agent. In some embodiments, a chain transfer agent comprises one or more alcohols. In other embodiments, a chain transfer agent comprises one or more mercaptans.

A dispersion, in some embodiments, further comprises an organic cosolvent. In some embodiments, an organic cosolvent is water-soluble. Organic cosolvents, in some embodiments, comprise acetone, methyl ethyl ketone, ethyl acetate, propylene glycol, dipropylene glycol monomethyl ether, dipropylene glycol, tripropylene glycol, hexylene glycol, ethanol, or mixtures thereof. In one embodiment, a dispersion comprises an organic cosolvent in an amount ranging from about 0.01 weight percent to about 50 weight percent of the dispersion. In another embodiment, a dispersion comprises an organic cosolvent in an amount ranging from about 0.1 weight percent to about 20 weight percent or from about 1 weight percent to about 15 weight percent of the dispersion. In a further embodiment, a dispersion comprises an organic cosolvent in an amount ranging from about 5 weight percent to about 10 weight percent of the dispersion.

In other embodiments, a dispersion comprising at least one emulsifier, a monomeric component, and a continuous phase comprising an aqueous solution of a compound of Formula (I) does not comprise an organic cosolvent.

In some embodiments, a dispersion comprising at least one emulsifier, a monomeric component, and a continuous phase comprising an aqueous solution of a compound of Formula (I) is a colloidal dispersion.

In another aspect, the present invention provides polymeric dispersions. In one embodiment, a polymeric dispersion comprises at least one emulsifier, a dispersed phase comprising a polymeric component, and a continuous phase comprising an aqueous solution of a compound of Formula (I)

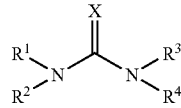

wherein X is O or S and,
wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, —C(O)O$R^5$, and —C(O)$R^5$,
wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

Turning now to components that can be included in polymeric dispersions of the present invention, polymeric dispersions of the present invention comprise at least one emulsifier. In some embodiments, at least one emulsifier comprises a surfactant. Surfactants suitable for use in a polymeric dispersion of the present invention, according to some embodiments of the present invention, comprise anionic surfactants, cationic surfactants, nonionic surfactants, amphoteric surfactants, or combinations thereof.

In some embodiments, anionic surfactants comprise alkyl sulfates, alkylbenzenesulfonates, ether sulfates, α-olefin sulfonates, ester sulfonates, dialkylsulfosuccinates, phosphate esters, acyl taurates, soaps, ether carboxylates, or mixtures thereof. Cationic surfactants, in some embodiments, comprise alkyl quaternary ammonium salts, benzylalkyldimethylammonium salts, amidoamine quaternaries, alkylamine salts, quaternary imidazolium compounds, ester quaternary compounds, or mixtures thereof. In some embodiments, nonionic surfactants comprise ethoxylated alcohols, ethoxylated alkylphenols, polyethylene glycol esters, fatty acid alkanolamides, ethoxylated alkanolamides, ethoxylated amines, esters of polyhydroxy compounds, ethoxylated esters, ethylene oxide/propylene oxide copolymers, perfluorinated ethoxylates, copolymers of perfluorinated acrylates or methacrylates, with ethoxylated acrylates or methacrylates, amine oxides, or mixtures thereof. Amphoteric surfactants, in some embodiments, comprise alkylamino acids, alkylbetaines, alkylaminobetaines, imidazoline-derived surfactants, sulfur containing amphoterics, lecithin, or mixtures thereof. In some embodiments, surfactants suitable for use in embodiments of the present invention comprise Geropon®, Rhodacal®, and Rhodafac® commercially available from Rhodia of Paris France, Pluronic® commercially available from BASF of Florham Park, N.J., Fluowet®, Genapol®, Hostapur®, and Hostapal®, commercially available from Clariant of Mettenz, Switzerland, Neodol® commercially available from Shell Chemicals, and Zonyl® commercially available from DuPont of Wilmington, Del.

In some embodiments, a polymeric dispersion comprises one or a plurality of emulsifiers in an amount ranging from about 0.1 weight percent to about 20 weight percent of the polymeric dispersion. In other embodiments, a dispersion comprises at least one emulsifier in an amount ranging from about 0.5 weight percent to about 15 weight percent of the polymeric dispersion. In another embodiment, a dispersion comprises at least one emulsifier in an amount ranging from about 1 weight percent to about 10 weight percent of the polymeric dispersion. In a further embodiment, a dispersion comprises at least one emulsifier in an amount ranging from about 2 weight percent to about 5 weight percent of the polymeric dispersion. In some embodiments, a dispersion comprises at least one emulsifier in an amount less than about 0.1 weight percent or greater than 20 weight percent of the dispersion.

In addition to at least one emulsifier, a polymeric dispersion comprises a dispersed phase comprising a polymeric component. A polymeric component, in some embodiments, comprises a plurality of polymeric particles. In some embodiments, polymeric particles have an average size ranging from about 1 nm to about 1 μm. In another embodiment, polymeric particles have an average size ranging from about 10 nm to about 800 nm, from about 50 nm to about 500 nm, or from about 75 nm to about 300 nm. In a further embodiment, polymeric particles have an average size ranging from about 100 nm to about 200 nm. In some embodiments, polymeric particles have an average size greater than about 1 μm. In one embodiment, polymeric particles have an average size ranging from about 20 nm to about 100 nm or from about 40 nm to about 130 nm.

Polymeric particles, in some embodiments, comprise hydrophobic polymers, oleophobic polymers, or combinations thereof. In some embodiments, polymeric particles comprise fluoropolymers including, but not limited to, fluoroalkyl methacrylates, fluoroalkyl aryl urethanes, fluoroalkyl allyl urethanes, fluoroalkyl urethane acrylates, fluoroalkyl acrylamides, or fluoroalkyl sulfonamide acrylates, or mixtures thereof. In other embodiments, polymeric particles comprise polytetrafluoroethylene (PTFE), fluorinated ethylene-propylene (FEP), perfluoroalkoxy resin (PFA), polychlorotrifluoroethylene (PCTFE), ethylene-tetrafluoroethylene (EPTFE), polyvinylidene fluoride (PVDF), or polyvinyl fluoride (PVF) or mixtures thereof.

In other embodiments, polymeric particles comprise olefinic polymers including, but not limited to, polyethylene, polypropylene, polybutene, or mixtures thereof. In a further embodiment, polymeric particles comprise elastomers including, but not limited to, 1,3-dienes and derivatives thereof. 1,3-dienes include styrene-1,3-butadiene (SBR), styrene-1,3-butadiene terpolymer with an unsaturated carboxylic acid (carboxylated SBR), acrylonitrile-1,3-butadiene (NBR or nitrile rubber), isobutylene-isoprene, cis-1,4-polyisoprene, 1,4-poly(1,3-butadiene), polychloroprene, and block copolymers of isoprene or 1,3-butadiene with styrene such as styrene-ethylene-butadiene-styrene (SEBS). In other embodiments, elastomers comprise polyalkene oxide polymers, acrylics, or polysiloxanes (silicones), fluoroelastomers, or combinations thereof.

In one embodiment, polymeric particles comprise polyvinyl chloride or acrylics such as polyacrylic acid, polymethacrylate, polymethylmethacrylate, or mixtures thereof. In some embodiments, polymeric particles comprise polyamides, polyesters, polyurethanes, or combinations thereof. In other embodiments, polymeric particles comprise polystyrenes, polyvinyl acetates, vinylacetate-ethylene copolymers, or mixtures thereof.

A polymeric dispersion, in some embodiments, comprises a polymeric component in an amount ranging from about 0.1 weight percent to about 70 weight percent of the dispersion. In other embodiments, a polymeric dispersion comprises a polymeric component in an amount ranging from about 0.5 weight percent to about 60 weight percent of the dispersion. In another embodiment, a polymeric dispersion comprises a polymeric component in an amount ranging from about 1 weight percent to about 50 weight percent or from about 5 weight percent to about 30 weight percent of the dispersion. In a further embodiment, a polymeric dispersion comprises a polymeric component in an amount ranging from about 10 weight percent to about 20 weight percent of the dispersion. In some embodiments, a polymeric dispersion comprises a polymeric component in an amount less than about 0.1 weight percent or greater than about 70 weight percent of the dispersion.

Polymeric dispersions, according to embodiments of the present invention, also comprise a continuous phase comprising an aqueous solution of a compound of Formula (I) as set forth herein. In some embodiments, a compound of Formula (I) is urea. In other embodiments, a compound of Formula (I) is dimethyl urea or diethyl urea. In some embodiments, a compound of Formula (I) is added directly to an aqueous continuous phase. In other embodiments, a compound of Formula (I) is solubilized in water, such as demineralized water, and the resulting solution is added to an aqueous continuous phase.

A polymeric dispersion, according to some embodiments, comprises a compound of Formula (I) in an amount ranging from about 0.1 weight percent to about 50 weight percent of the dispersion. In other embodiments, a polymeric dispersion comprises a compound of Formula (I) in an amount ranging from about 0.5 weight percent to about 40 weight percent of the dispersion. In another embodiment, a polymeric dispersion comprises a compound of Formula (I) in an amount ranging from about 1 weight percent to about 30 weight percent or from about 5 weight percent to about 25 weight percent of the dispersion. In a further embodiment, a polymeric dispersion comprises a compound of Formula (I) in an amount ranging from about 10 weight percent to about 20 weight percent.

In some embodiments, a compound of Formula (I) is operable to crosslink with the polymeric particles during heating or curing of the polymeric particles. In one embodiment, for example, the polymeric dispersion is applied to a substrate and subsequently cured. A compound of Formula (I), in some embodiments, can crosslink with the polymeric particles during the curing process thereby enhancing the repellency and/or protective properties of the polymeric dispersion on the substrate.

A polymeric dispersion, in some embodiments, further comprises an organic cosolvent. In some embodiments, an organic cosolvent is water-soluble. Organic cosolvents, in some embodiments, comprise acetone, methyl ethyl ketone, ethyl acetate, propylene glycol, dipropylene glycol monomethyl ether, dipropylene glycol, tripropylene glycol, hexylene glycol, ethanol, or mixtures thereof. In one embodiment, a polymeric dispersion comprises an organic cosolvent in an amount ranging from about 0.01 weight percent to about 50 weight percent of the dispersion. In another embodiment, a polymeric dispersion comprises an organic cosolvent in an amount ranging from about 0.1 weight percent to about 20 weight percent or from about 1 weight percent to about 15 weight percent of the dispersion. In a further embodiment, a polymeric dispersion comprises an organic cosolvent in an amount ranging from about 5 weight percent to about 10 weight percent of the dispersion.

In other embodiments, a dispersion comprising at least one emulsifier, a dispersed phase comprising a polymeric component, and a continuous phase comprising an aqueous solution of a compound of Formula (I) does not comprise an organic cosolvent.

In some embodiments, a dispersion comprising at least one emulsifier, a dispersed phase comprising a polymeric component, and a continuous phase comprising an aqueous solution of a compound of Formula (I) is a colloidal dispersion.

In another aspect, the present invention provides substrates coated or treated with a polymeric dispersion of the present invention. In one embodiment, a substrate comprises at least one surface at least partially coated with a polymeric dispersion comprising a dispersed phase comprising a polymeric component and a continuous phase comprising an aqueous solution of a compound of Formula (I). In some embodiments, a substrate comprises a plurality of surfaces wherein each of the plurality of surfaces is at least partially coated with a polymeric dispersion of the present invention.

Substrates, in some embodiments, comprise cellulosic materials, including paper, wood, cellulose acetate fibers, and cotton materials, including, but not limited to, cotton fibers, woven cotton articles, and non-woven cotton articles. In other embodiments, substrates comprise natural fibers in addition to cellulose fibers including, but not limited to, wool and silk fibers. In another embodiment, substrates comprise synthetic fibers. Synthetic fibers, in some embodiments, comprise nylon (polyamide) fibers, polyester fibers, polyolefin fibers, polyurethane fibers, polyacrylonitrile fibers, or combinations thereof. In a further embodiment, a substrate comprises leather, thermoplastics, thermosets, metals, porcelain, carpet, masonry, stones, brick, wood, plastics, painted surfaces, and dyed surfaces.

In some embodiments, a substrate comprising at least one surface at least partially coated with a polymeric dispersion of the present invention comprising a dispersed phase comprising a polymeric component and a continuous phase comprising an aqueous solution of a compound of Formula (I) has an oil repellency of at least 5 according to AATCC 118. In other embodiments, the treated substrate has an oil repellency of at least 6 according to AATCC 118. In a further embodiment, the treated substrate has an oil repellency of at least 7 according to AATCC 118. In some embodiments, polymeric dispersions of the present invention at least partially coating surfaces of substrates having the foregoing oil repellencies do not comprise an organic cosolvent. In other embodiments, the polymeric dispersion comprises an organic cosolvent.

In some embodiments, a substrate comprising at least one surface at least partially coated with a polymeric dispersion of the present invention comprising a dispersed phase comprising a polymeric component and a continuous phase comprising an aqueous solution of a compound of Formula (I) has a water/alcohol repellency of at least 6 according to AATCC 193. In other embodiments, the treated substrate has a water/alcohol repellency of at least 8 according to AATCC 193. In some embodiments, polymeric dispersions of the present invention at least partially coating surfaces of substrates having the foregoing water/alcohol repellencies do not comprise an organic cosolvent. In other embodiments, the polymeric dispersions comprise an organic cosolvent.

In some embodiments, a substrate comprising at least one surface at least partially coated with a polymeric dispersion of the present invention comprising a dispersed phase comprising a polymeric component and a continuous phase comprising an aqueous solution of a compound of Formula (I) has a spray rating of at least 70 according to AATCC 22. In other embodiments, the treated substrate has a spray rating of at least 80 according to AATCC 22. In another embodiment, the treated substrate has a spray rating of at least 90 according to AATCC 22. In a further embodiment, the treated substrate has a spray rating of 100 according to AATCC 22. In some embodiments, polymeric dispersions of the present invention at least partially coating surfaces of substrates having the foregoing spray ratings do not comprise an organic cosolvent. In other embodiments, the polymeric dispersions comprise an organic cosolvent.

In some embodiments, a substrate comprising at least one surface at least partially coated with a polymeric dispersion comprising a dispersed phase comprising a polymeric component and a continuous phase comprising an aqueous solution of a compound of Formula (I) has a dry crocking fastness of at least 3.5 according to AATCC 8. In other embodiments, the treated substrate has a dry crocking fastness of at least 4.5 according to AATCC 8. Moreover, in some embodiments, a substrate comprising at least one surface at least partially coated with a polymeric dispersion comprising a dispersed phase comprising a polymeric component and a continuous phase comprising an aqueous solution of a compound of Formula (I) has a wet crocking fastness of at least 3.5 according to AATCC 8. In other embodiments, the treated substrate has a wet crocking fastness of at least 4.5 according to AATCC 8.

In some embodiments, polymeric dispersions of the present invention at least partially coating surfaces of substrates having the foregoing dry and wet crocking fastness do not comprise an organic cosolvent. In other embodiments, the polymeric dispersions comprise an organic cosolvent.

In some embodiments, substrates having at least one surface at least partially coated with a polymeric dispersion of the present invention displaying one or more of the AATCC properties provided herein comprise synthetic fibers. In other embodiments, the substrates comprise natural fibers, such as cellulosic fibers.

In another aspect, the present invention provides methods of conducting emulsion polymerizations. In one embodiment, a method of conducting an emulsion polymerization comprises providing a dispersion comprising at least one emulsifier, at least one initiator, a monomeric component, and a continuous phase comprising an aqueous solution of a compound of Formula (I)

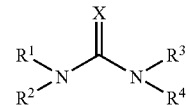

wherein X is O or S and,
wherein $R^1$, $R^2$, $R^3$, and $R^4$ are independently selected from the group consisting of hydrogen, alkyl, alkenyl, alkynyl, fluoroalkyl, fluoroalkenyl, fluoroalkynyl, cycloalkyl, heterocyclyl, aryl, heteroaryl, $—C(O)OR^5$, and $—C(O)R^5$,
wherein the alkyl, alkenyl, alkynyl, fluoroalkyl, fluoroalkenyl, fluoroalkynyl, cycloalkyl, heterocyclyl, aryl, and heteroaryl groups are optionally substituted one or more times with a substitutent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

Emulsifiers, monomeric components, and initiators suitable for use in methods of conducting emulsion polymerizations, according to embodiments of the present invention, comprise any of the same described herein.

Moreover, in some embodiments, a compound of Formula (I) is added directly to the aqueous continuous phase. In other embodiments, a compound of Formula (I) is solubilized in water, such as demineralized water, and the resulting solution is added to the aqueous continuous phase.

In some embodiments, the at least emulsifier, monomeric component, and continuous phase comprising an aqueous solution of a compound of Formula (I) are mixed and strongly agitated by mechanical means or by high pressure homogenization to provide the dispersion.

A method of conducting an emulsion polymerization, according to embodiments of the present invention, further comprises forming a polymeric material. Forming a polymeric material, in some embodiments, comprises initiating polymerization of the monomeric component, propagating polymerization of the monomeric component, and terminating polymerization of the monomeric component. Initiating polymerization, in some embodiments, comprises heating the at least one initiator in the dispersion to a temperature ranging from about 20° C. to about 150° C.

In another embodiment, a method of conducting an emulsion polymerization comprises providing a dispersion comprising at least one emulsifier, at least one initiator, a monomeric component, and an aqueous continuous phase; initiating polymerization of the monomeric component with the at least one initiator; and adding to the dispersion a compound of Formula (I) during polymerization of the monomeric component. Initiating polymerization of the monomeric component, in some embodiments, comprises heating the at least one initiator in the dispersion to a temperature ranging from about 20° C. to about 150° C.

In some embodiments, a compound of Formula (I) is added directly to the dispersion during polymerization of the monomeric component. In other embodiments, a compound of Formula (I) is solubilized in water, such as demineralized water, and the resulting solution is added to the dispersion during polymerization of the monomeric component.

In a further embodiment, a method of conducting an emulsion polymerization comprises providing a dispersion comprising at least one emulsifier, at least one initiator, a monomeric component, and an aqueous continuous phase; forming a polymeric material; and adding to the dispersion a compound of Formula (I) after forming the polymeric material.

In some embodiments, the at least one emulsifier, monomeric component, and continuous phase are mixed and strongly agitated by mechanical means or by high pressure homogenization to provide the dispersion. In some embodiments, forming a polymeric material comprises initiating polymerization of the monomeric component, propagating polymerization of the monomeric component, and terminating polymerization of the monomeric component. Initiating polymerization of the monomeric component, in some embodiments, comprises heating the at least one initiator to a temperature ranging from about 20° C. to about 150° C.

In some embodiments, a compound of Formula (I) is added directly to the dispersion after forming the polymeric material. In other embodiments, a compound of Formula (I) is solubilized in water, such as demineralized water, and the resulting solution is added to the dispersion after forming the polymeric material.

In some embodiments of the present invention, methods of conducting emulsion polymerizations further comprise adding an organic cosolvent to the dispersion. In some embodiments, the organic cosolvent is added to the dispersion prior to initiation of polymerization of the monomeric component. In other embodiments, the organic cosolvent is added to the dispersion after initiation of polymerization of the monomeric component. In a further embodiment, substantially no organic cosolvent is added to the dispersion during any stage of the emulsion polymerization.

In an additional aspect, the present invention provides methods of producing a coated substrate. In one embodiment, a method for producing a coated substrate comprises providing a substrate having at least one surface, providing a polymeric dispersion comprising a dispersed phase comprising a polymeric component and a continuous phase comprising an aqueous solution of a compound of Formula (I), and applying the polymeric dispersion to at least a portion of the at least one surface. In some embodiments, the polymeric dispersion is applied to the entire surface.

In some embodiments, applying the polymeric dispersion comprises spray coating, dip coating, passing the substrate through kiss rollers, or spreading onto or coating the at least one surface through a head box, optionally with the aid of a doctor blade. Substrates suitable for use in methods of the present invention, in some embodiments, comprise any substrate described herein.

In another aspect, the present invention provides methods of increasing the resistance to flammability of dispersions, including polymeric dispersions. In some embodiments, a method of increasing the resistance to flammability of a dispersion comprises adding a compound of Formula (I) to the dispersion. In some embodiments, a dispersion comprises a polymeric dispersion. In other embodiments, a dispersion comprises a monomeric component.

In another embodiment, a method of increasing the resistance to flammability of a dispersion comprising an organic solvent comprises substituting at least a portion of the organic solvent with a compound of Formula (I). In some embodiments, substantially all of the organic solvent is substituted by a compound of Formula (I) or solution thereof.

Embodiments of the present invention a further illustrated in the following non-limiting examples.

Example 1

Emulsion Polymerization Comprising a Compound of Formula (I)

The components of Table 1 were added to a 1 L glass beaker.

TABLE 1

| Component | Amount (in grams) |
|---|---|
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 296.0 |
| Urea (solubilized in demineralized water) | 60 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 100 nm was measured immediately after homogenization.

The monomer emulsion was transferred to a 600 ml glass reactor with agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A storage stable polymeric dispersion was obtained with a final particle size of about 110 nm.

Example 2

Comparative Example of Emulsion Polymerization not Comprising a Compound of Formula (I)

The components of Table 2 were added to a 1 L glass beaker.

TABLE 2

| Component | Amount (in grams) |
|---|---|
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 296.0 |
| Dipropyleneglycol monomethylether | 60 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 90 nm was measured immediately after homogenization.

The monomer emulsion was transferred to a 600 ml glass reactor with agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A settlement-free polymeric dispersion was obtained with a final particle size of about 100 nm.

Comparison of the polymeric dispersion of Example 1, one embodiment of the present invention, with that of the prior art polymeric dispersion of Example 2 is provided in Table 3.

TABLE 3

| Comparison of Example 1 and Example 2 | |
|---|---|
| Example | VOC Content (%) |
| 1 | 0 |
| 2 | 12 |

As demonstrated in Table 3, the polymeric dispersion of Example 1 displayed 0% volatile organic compound content while the polymeric dispersion of Example 2 displayed a 12% volatile organic compound content.

Example 3

Comparison of Polymeric Dispersions of Examples 1 and 2 in Application to Textiles The polymeric dispersions of Examples 1 and 2 were diluted with water to a concentration of 4%. The resulting diluted polymeric dispersions were acidified with 0.4 g/l citric acid (50%). 100% polyester woven microfiber fabrics, which were dyed deep red, and a 100% cotton woven fabrics were padded on a Mathis laboratory padder with the diluted polymeric dispersions of Examples 1 and 2. The wet pick-up was about 70% for the polyester fabrics and about 80% for the cotton fabrics. The polyester and cotton fabrics were subsequently dried and cured in a Mathis laboratory oven. The polyester and cotton fabrics recorded an actual heat exposure of 175° C. for 45 seconds. The polyester and cotton fabrics were subsequently tested for oleophobic and hydrophobic properties. The oleophobic properties were tested according to AATCC 118. The hydrophobic properties were tested according to AATCC 22 and AATCC 193. The crocking fastness of the polyester fabrics was tested as well. Tables 4 and 5 summarize the results of the testing.

TABLE 4

| Results for Polyester Material | | |
|---|---|---|
| Property | Example 1 | Example 2 |
| Oil Repellency (AATCC 118) | 7 | 7 |
| Water/Alcohol Repellency (AATCC 193) | >8 (10) | >8 (10) |
| Spray Rating (AATCC 22) | 100 | 100 |
| Dry Crocking Fastness (AATCC 8) | 4.5 | 3.5 |
| Wet Crocking Fastness (AATCC 8) | 3.5 | 3.5 |

TABLE 5

| Results for Cotton Material | | |
|---|---|---|
| Property | Example 1 | Example 2 |
| Oil Repellency (AATCC 118) | 6.5 | 6.5 |
| Water/Alcohol Repellency (AATCC 193) | >8 (10) | >8 (10) |
| Spray Rating (AATCC 22) | 100 | 100 |

As demonstrated in Tables 4 and 5, the polymeric dispersion of Example 1 displayed oleophobic and hydrophobic properties consistent with those of the polymeric dispersion of Example 2. Moreover, the dry crocking fastness of the polymeric dispersion of Example 1 was greater than that of the polymeric dispersion of Example 2 for the polyester material. The polymeric dispersion of Example 1, however, had no volatile organic compound content. The VOC free nature of the polymeric dispersion of Example 1, according to embodiments of the present invention, can reduce and/or eliminate costs associated with the use of organic cosolvents such as regulatory costs and distilling costs without compromising performance characteristics.

Example 4

Comparison of Polymeric Dispersions of Examples 1 and 2 in Application to Textiles The polymeric dispersions of Examples 1 and 2 were diluted with water to a concentration of 3%. 100% polyester woven fabrics were padded on a Mathis laboratory padder with the diluted polymeric dispersions of Examples 1 and 2. The wet pick-up was about 70%. The polyester fabrics were subsequently dried and cured on a Mathis laboratory oven. The polyester fabrics recorded an actual heat exposure of 175° C. for 45 seconds. The polyester fabrics were subsequently tested for flame retarding character. The polyester fabrics were cut into 5 cm×15 cm strips and hung vertically in a laboratory hood. The lower end of the fabric strips were ignited with a gas lighter. The burn time was recorded, wherein burn time was measured as the time to complete combustion of the strip. Table 6 provides the results of the testing.

TABLE 6

| Results of Flammability Testing | | |
|---|---|---|
| Property | Example 1 | Example 2 |
| Burn Time | 4 minutes 5 seconds | 2 minutes 16 seconds |

As displayed in Table 6, the burn time of the polyester woven fabric treated with the polymeric dispersion of Example 1 was much slower than that of Example 2, thereby demonstrating the enhanced non-flammability characteristics imparted by polymeric dispersions according to embodiments of the present invention.

Example 5

Emulsion Polymerization Comprising an Organic Co-Solvent and a Compound of Formula (I)

The components of Table 7 were added to a 1 L glass beaker.

TABLE 7

| Component | Amount (in grams) |
|---|---|
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 296.0 |
| Dipropyleneglycol monomethylether | 30 |
| Urea (solubilized in demineralized water) | 30 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 124 nm was measured immediately after homogenization.

The monomer emulsion was transferred to a 600 ml glass reactor with an agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A storage stable polymeric dispersion was obtained with a final particle size of about 116 nm.

Example 6

Emulsion Polymerization without any Organic Co-Solvent or Compound of Formula (I) (Comparative)

The components of Table 8 were added to a 1 L glass beaker.

TABLE 8

| Component | Amount (in grams) |
|---|---|
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 356.0 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 115 nm was measured immediately after homogenization.

The monomer emulsion was transferred to a 600 ml glass reactor with agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A polymeric dispersion was obtained with visual gritty particles floating on top of the dispersion. Build-up was also recognized on the agitator and the glass walls of the reactor. The liquid part was measured with a final particle size of about 124 nm.

Example 7

Emulsion Polymerization Comprising a Compound of Formula (I)

The components of Table 9 were added to a 1 L glass beaker.

TABLE 9

| Component | Amount (in grams) |
|---|---|
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 296.0 |
| Thio Urea (solubilized in demineralized water) | 60 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 109 nm was measured immediately after homogenization.

The monomer emulsion was transferred to a 600 ml glass reactor with agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A storage stable polymeric dispersion was obtained with a final particle size of about 110 nm.

Example 8

Emulsion Polymerization Comprising a Compound of Formula (I)

The components of Table 10 were added to a 1 L glass beaker.

TABLE 10

| Component | Amount (in grams) |
|---|---|
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 296.0 |
| 1,1-Dimethylurea (solubilized in demineralized water) | 60 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 112 nm was measured immediately after homogenization.

The monomer emulsion was transferred to a 600 ml glass reactor with agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A storage stable polymeric dispersion was obtained with a final particle size of about 107 nm.

Example 9

Emulsion Polymerization Comprising a Compound of Formula (I)

The components of Table 11 were added to a 1 L glass beaker.

TABLE 11

| Component | Amount (in grams) |
| --- | --- |
| Perfluoralkyl acrylate ($C_nF_{2n+1}$—$C_2H_4$-acrylate) wherein n = 6, 8, 10, 12, >12 in ratios by weight of 3:61:24:12 | 62.5 |
| Stearyl acrylate | 50.0 |
| N-methylol methacrylamide | 8.5 |
| glycidyl methacrylate | 3.0 |
| N-(n-butoxymethyl)acrylamide | 5.0 |
| Dodecanethiol | 0.5 |
| Stearylamine ethoxylate | 7.5 |
| Polyoxyethylene sorbitane monooleate | 2.5 |
| Demineralized water | 296.0 |
| 1,1 Diethylurea (solubilized in demineralized water) | 60 |

The mixture was heated to a temperature of 50° C. and subsequently homogenized in an APV Gaulin high pressure homogenizer. The particle size of the monomer emulsion (dispersion) was measured with a Coulter model N4MD submicron particle analyzer. A particle size of 102 nm was measured immediately after homogenization.

The monomer emulsion was transferred to a 600 ml glass reactor with agitator, reflux condenser, heating mantle, thermometer, and gas inlet. The emulsion was heated to 50° C., while purging with nitrogen. The polymerization was initiated with 4.5 g of 2,2'azobis(2-amidinopropane)dihydrochloride. The reaction was administered for 4 hours at 60° C. A polymeric dispersion was obtained with some particles floating on top of the dispersion. The liquid part was measured with a final particle size of about 98 nm.

Example 10

Comparison of Polymeric Dispersions of Examples 5 to 9 in Application to Textiles The polymeric dispersions of Examples 5 to 9 were diluted with water to a concentration of 4%. The resulting diluted polymeric dispersions were acidified with 0.4 g/l citric acid (50%). 100% polyester knitted automotive headliner fabrics, which were dyed grey, and a 100% cotton woven fabrics were padded on a Mathis laboratory padder with the diluted polymeric dispersions of Examples 5 to 9. The wet pick-up was about 90% for the polyester fabrics and about 80% for the cotton fabrics. The polyester and cotton fabrics were subsequently dried and cured in a Mathis laboratory oven. The polyester and cotton fabrics recorded an actual heat exposure of 175° C. for 45 seconds. The polyester and cotton fabrics were subsequently tested for oleophobic and hydrophobic properties. The oleophobic properties were tested according to AATCC 118. The hydrophobic properties were tested according to AATCC 22 and AATCC 193. The results of the oleophobic and hydrophobic testing are summarized in Tables 12 and 13.

TABLE 12

Results for Polyester Material

| Property | Example 5 | Example 6 | Example 7 | Example 8 | Example 9 |
| --- | --- | --- | --- | --- | --- |
| Oil Repellency (AATCC 118) | 7 | 7 | 7 | 7 | 7 |
| Water/Alcohol Repellency (AATCC 22) | 12 | 10 | 10 | 12 | 10 |
| Spray Rating (AATCC 22) | 100 | 100 | 100 | 100 | 100 |

TABLE 13

Results for Cotton Material

| Property | Example 5 | Example 6 | Example 7 | Example 8 | Example 9 |
| --- | --- | --- | --- | --- | --- |
| Oil Repellency (AATCC 118) | 6.5 | 6 | 6 | 6.5 | 6 |
| Water/Alcohol Repellency (AATCC 22) | 10 | 10 | 10 | 10 | 8 |
| Spray Rating (AATCC 22) | 100 | 90 | 100 | 100 | 90 |

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

That which is claimed is:

1. A dispersion comprising:
   at least one emulsifier;
   a monomeric component comprising a plurality of monomers having at least one polymerizable functionality comprising a site of unsaturation; and
   a continuous phase comprising an aqueous solution of a compound of Formula (I)

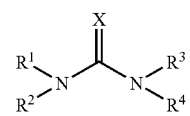

wherein X is O and,
wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and —C(O)OR$^5$, wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$, wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

2. The dispersion of claim 1, wherein $R^1$, $R^2$, $R^3$, and $R^4$ are hydrogen.

3. The dispersion of claim 1, wherein the monomeric component comprises a plurality of vinylic monomers.

4. The dispersion of claim 1, wherein the at least one emulsifier comprises a surfactant.

5. The dispersion of claim 4, wherein the surfactant comprises anionic surfactants, cationic surfactants, nonionic surfactants, amphoteric surfactants, or mixtures thereof.

6. The dispersion of claim 1, wherein the dispersion is colloidal.

7. The dispersion of claim 1, further comprising an organic solvent.

8. The dispersion of claim 1, wherein the dispersion does not comprise an organic cosolvent.

9. The dispersion of claim 1, wherein the monomeric component comprises trifluoromethyl acrylate monomer, perfluoroalkyl acrylate monomer, perfluoroalkyl methacrylate monomer or mixtures thereof.

10. The dispersion of claim 1, wherein the monomeric component comprises methacrylate monomers, acrylate monomers, methacrylamide monomers, acrylamide monomers or mixtures thereof.

11. The dispersion of claim 10, wherein the methacrylate monomers comprise alkyl methacrylates, aryl methacrylates, hydroxy functional methacrylates, epoxy functional methacrylates, isocyanate functional methacrylates, or fluoroalkyl methacrylates or mixtures thereof.

12. The dispersion of claim 10, wherein the acrylate monomers comprise alkyl acrylates, aryl acrylates, hydroxy functional acrylates, epoxy functional acrylates, isocyanate functional acrylates, or fluoroalkyl acrylates or mixtures thereof.

13. A polymeric dispersion comprising:
   at least one emulsifier;
   a dispersed phase comprising a polymeric component comprising fluoropolymer particles; and
   a continuous phase comprising an aqueous solution of a compound of Formula (I)

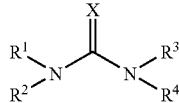

wherein X is O and,
   wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and —C(O)OR$^5$,
   wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$,
   wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

14. The dispersion of claim 13, wherein the fluoropolymer particles have an average size ranging from about 1 nm to about 1 μm.

15. The dispersion of claim 13, wherein the fluoropolymer particles comprise fluoroalkyl methacrylates, fluoroalkyl acrylates, fluoroalkyl aryl urethanes, fluoroalkyl urethanes, fluoroalkyl allyl urethanes, fluoroalkyl urethane acrylates, fluoroalkyl acrylamides, fluoroalkyl sulfonamide acrylates, or mixtures thereof.

16. The dispersion of claim 15, wherein the polymeric particles have an average size ranging from about 100 nm to about 200 nm.

17. The dispersion of claim 15, wherein the polymeric particles have an average size ranging from about 40 nm to about 130 nm.

18. The dispersion of claim 15, wherein the polymeric particles are present in an amount ranging from about 5 weight percent to about 30 weight percent.

19. The dispersion of claim 13, wherein the fluoropolymer particles comprise polytetrafluoroethylene, fluorinated ethylene-propylene (FEP), perfluoroalkoxy resin, polytrichlorotrifluoroethylene, ethylene-tetrafluoroethylene, polyvinylidene fluoride, polyvinyl fluoride, or mixtures thereof.

20. The dispersion of claim 13, wherein the dispersion is colloidal.

21. The dispersion of claim 13, wherein the dispersion has substantially no organic co-solvent.

22. A method of conducting emulsion polymerization comprising:
   providing a dispersion comprising at least one emulsifier, at least one initiator, a monomeric component comprising a plurality of monomers having at least one polymerizable functionality comprising a site of unsaturation, and a continuous phase comprising an aqueous solution of a compound of Formula (I)

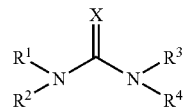

wherein X is O and,
   wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and —C(O)OR$^5$,
   wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$,
   wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

23. The method of claim 22, further comprising forming a polymeric material.

24. The method of claim 23, wherein forming a polymeric material comprises initiating polymerization of the monomeric component, propagating polymerization of the monomeric component, and terminating polymerization of the polymeric component.

25. The method of claim 22, wherein the monomeric component comprises methacrylate monomers, acrylate monomers, methacrylamide monomers, acrylamide monomers or mixtures thereof.

26. The method of claim 25, wherein the methacrylate monomers comprise alkyl methacrylates, aryl methacrylates, hydroxy functional methacrylates, epoxy functional methacrylates, isocyanate functional methacrylates, or fluoroalkyl methacrylates or mixtures thereof.

27. The method of claim 25, wherein the acrylate monomers comprise alkyl acrylates, aryl acrylates, hydroxy functional acrylates, epoxy functional acrylates, isocyanate functional acrylates, or fluoroalkyl acrylates or mixtures thereof.

28. A method of conducting an emulsion polymerization comprising:
providing a dispersion comprising at least one emulsifier, at least one initiator, a monomeric component comprising a plurality of monomers having at least one polymerizable functionality comprising a site of unsaturation, and an aqueous continuous phase;
initiating polymerization of the monomeric component with the at least one initiator; and
adding to the dispersion during polymerization of the monomeric component a compound of Formula (I)

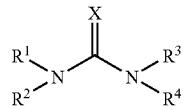

wherein X is O and,
wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and $—C(O)OR^5$,
wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

29. A method of conducting an emulsion polymerization comprising:
providing a dispersion comprising at least one emulsifier, at least one initiator, a monomeric component comprising a plurality of monomers having at least one polymerizable functionality comprising a site of unsaturation, and an aqueous continuous phase;
forming a polymeric material; and
adding to the dispersion, after forming the polymeric material, a compound of Formula (I)

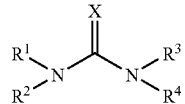

wherein X is O and,
wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and $—C(O)OR^5$,
wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

30. The method of claim 29, wherein forming a polymeric material comprises initiating polymerization of the monomeric component, propagating polymerization of the monomeric component, and terminating polymerization of the monomeric component.

31. A method of conducting emulsion polymerization comprising:
providing a dispersion comprising:
at least one emulsifier;
at least one initiator;
a monomeric component comprising trifluoromethyl acrylate monomer, perfluoroalkyl acrylate monomer, perfluoroalkyl methacrylate monomer or mixtures thereof;
and a continuous phase comprising an aqueous solution of a compound of Formula (I)

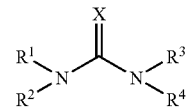

wherein X is O and,
wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and $—C(O)OR^5$, and
wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$,
wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine; and forming a polymeric material from the monomer component, wherein the polymeric material is dispersed in the aqueous solution of the compound of Formula (I).

32. The method of claim 31, wherein the dispersion has substantially no organic cosolvent.

33. A substrate comprising:
at least one surface at least partially coated with a polymeric dispersion comprising a dispersed phase comprising a polymeric component comprising fluoropolymer particles and a continuous phase comprising an aqueous solution of a compound of Formula (I)

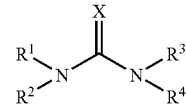

wherein X is O and
wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and $—C(O)OR^5$,
wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$, wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine.

34. The substrate of claim 33, wherein the substrate comprises paper, leather, woven articles, non-woven articles, carpet, metals, masonry, wood products, stone, ceramics, plastics, natural fibers, synthetic fibers, or combinations thereof.

35. The substrate of claim 34, wherein the synthetic fibers comprise polyamide fibers, polyester fibers, polyolefin fibers, polyurethane fibers, polyacrylonitrile fibers, or combinations thereof.

36. The substrate of claim 34, wherein the natural fibers comprise cotton fibers, cellulose acetate fibers, cellulose-based fibers, wool fibers, silk fibers, or combinations thereof.

37. The substrate of claim 33, wherein the substrate has an oil repellency of at least 5 according to AATCC 118.

38. The substrate of claim 33, wherein the substrate has an oil repellency of at least 6 according to AATCC 118.

39. The substrate of claim 33, wherein the substrate has an oil repellency of at least 7 according to AATCC 118.

40. The substrate of claim 33, wherein the substrate has a water/alcohol repellency of at least 6 according to AATCC 193.

41. The substrate of claim 33, wherein the substrate has a water/alcohol repellency of at least 8 according to AATCC 193.

42. The substrate of claim 33, wherein the substrate has a spray rating of at least 80 according to AATCC 22.

43. The substrate of claim 33, wherein the substrate has a spray rating of at least 90 according to AATCC 22.

44. The substrate of claim 33, wherein the substrate has a spray rating of 100 according to AATCC 22.

45. The substrate of claim 33, wherein the substrate has a dry crocking fastness of at least 3.5 according to AATCC 8.

46. The substrate of claim 33, wherein the substrate has a dry crocking fastness of at least 4.5 according to AATCC 8.

47. The substrate of claim 33, wherein the substrate has a wet crocking fastness of at least 3.5.

48. The substrate of claim 33, wherein the substrate has a dry crocking fastness of at least 4.5.

49. A method of producing a coated substrate comprising:
providing a substrate having at least one surface;
providing a polymeric dispersion comprising a dispersed phase comprising a polymeric component comprising fluoropolymer particles and a continuous phase comprising an aqueous solution of a compound of Formula (I);

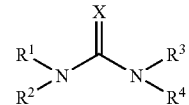

wherein X is O and wherein $R^1$, $R^2$, $R^3$, and $R^4$ are independently selected from the group consisting of hydrogen, alkyl, fluoroalkyl, fluoroalkenyl, fluoroalkynyl, cycloalkyl, heterocyclyl, aryl, heteroaryl and —C(O)OR$^5$, wherein the alkyl, fluoroalkyl, fluoroalkenyl, fluoroalkynyl, cycloalkyl, heterocyclyl, aryl, and heteroaryl groups are optionally substituted one or more times with a substituent independently selected from $R^5$, wherein $R^5$ is selected from the group consisting of hydrogen, alkyl, alkenyl, alkynyl, fluoroalkyl, fluoroalkenyl, fluoroalkynyl, cycloalkyl, heterocyclyl, aryl, heteroaryl, hydroxy, carboxy, alkoxy, sulfonyl, sulfonic, and amine; and applying the polymeric dispersion to at least a portion of the at least one surface.

50. The method of claim 49, wherein the substrate comprises paper, leather, woven articles, non-woven articles, carpet, metals, masonry, wood products, stone, ceramics, plastics, natural fibers, synthetic fibers, or combinations thereof.

51. The substrate of claim 50, wherein the synthetic fibers comprise polyamide fibers, polyester fibers, polyolefin fibers, polyurethane fibers, polyacrylonitrile fibers, or combinations thereof.

52. The substrate of claim 50, wherein the natural fibers comprise cotton fibers, cellulose acetate fibers, wool fibers, silk fibers, or combinations thereof.

* * * * *